United States Patent
Jensen

(10) Patent No.: US 8,958,587 B2
(45) Date of Patent: Feb. 17, 2015

(54) SIGNAL DEREVERBERATION USING ENVIRONMENT INFORMATION

(75) Inventor: Jesper Jensen, Smørum (DK)

(73) Assignee: Oticon A/S, Smorum (DK)

( * ) Notice: Subject to any disclaimer, the term of this patent is extended or adjusted under 35 U.S.C. 154(b) by 607 days.

(21) Appl. No.: 13/089,053

(22) Filed: Apr. 18, 2011

(65) Prior Publication Data

US 2011/0255702 A1 Oct. 20, 2011

Related U.S. Application Data

(60) Provisional application No. 61/325,830, filed on Apr. 20, 2010.

(30) Foreign Application Priority Data

Apr. 20, 2010 (EP) .................................... 10160435

(51) Int. Cl.
*H04R 25/00* (2006.01)
*G01H 7/00* (2006.01)
(Continued)

(52) U.S. Cl.
CPC *G01H 7/00* (2013.01); *G10L 15/20* (2013.01); *H04R 25/554* (2013.01); *H04S 7/305* (2013.01); *H04R 25/407* (2013.01); *G10L 2021/02082* (2013.01); *H04R 2225/39* (2013.01); *H04R 2225/41* (2013.01); *H04R 2225/43* (2013.01); *H04R 2225/55* (2013.01)
USPC ........................................... 381/315; 381/63

(58) Field of Classification Search
USPC ........... 381/63, 56, 60, 61, 321, 28, 312, 315; 704/207, 233, 275
See application file for complete search history.

(56) References Cited

U.S. PATENT DOCUMENTS 5,457,769 A 10/1995 Valley
8,214,179 B2 * 7/2012 Carlbom et al. .................. 703/2
(Continued)

FOREIGN PATENT DOCUMENTS

AT 410 597 B 6/2003
EP 1 460 769 A1 9/2004
(Continued)

OTHER PUBLICATIONS

Habets, "Single- and Multi-Microphone Speech Dereverberation using Spectral Enhancement," Ph.D. Thesis, Technische Universiteit Eindhoven, The Netherlands, Jun. 25, 2007.
(Continued)

*Primary Examiner* — Vivian Chin
*Assistant Examiner* — Ammar Hamid
(74) *Attorney, Agent, or Firm* — Birch, Stewart, Kolasch & Birch, LLP

(57) ABSTRACT

An audio processing system includes an audio processing device and an external device, the audio processing device having a signal processing unit adapted for running an algorithm for processing an input signal representing an acoustic signal from the environment of the user and providing a processed output signal. The external device includes in an information signal a measure, characteristic of the reverberation of the room or location where the audio processing device is located, and the audio processing device is adapted to extract the measure of the reverberation from the information signal and use the measure as an input to an algorithm that includes a directional algorithm for providing a directional characteristic of the input signal.

28 Claims, 5 Drawing Sheets

(51) Int. Cl.
*G10L 15/20* (2006.01)
*H04S 7/00* (2006.01)
*H03G 3/00* (2006.01)
*G10L 21/0208* (2013.01)

(56) References Cited

U.S. PATENT DOCUMENTS

| | | | |
|---|---|---|---|
| 2002/0067835 A1* | 6/2002 | Vatter | 381/58 |
| 2002/0147580 A1 | 10/2002 | Mekuria et al. | |
| 2004/0213415 A1* | 10/2004 | Rama et al. | 381/63 |
| 2005/0244023 A1 | 11/2005 | Roeck et al. | |
| 2007/0009122 A1 | 1/2007 | Hamacher | |
| 2007/0036365 A1 | 2/2007 | Rohrseitz | |
| 2007/0237335 A1* | 10/2007 | O'Sullivan | 381/63 |
| 2008/0107277 A1 | 5/2008 | Somasundaram et al. | |
| 2009/0208043 A1 | 8/2009 | Woods et al. | |
| 2010/0092017 A1* | 4/2010 | Waldmann | 381/315 |
| 2011/0129095 A1* | 6/2011 | Avendano et al. | 381/63 |

FOREIGN PATENT DOCUMENTS

| | | |
|---|---|---|
| EP | 1 956 589 A1 | 8/2008 |
| WO | 2004/077090 A1 | 9/2004 |
| WO | 2008/128563 A1 | 10/2008 |
| WO | 2009/135872 A1 | 11/2009 |

OTHER PUBLICATIONS

Lollmann et al., "Low Delay Noise Reduction and Dereverberation for Hearing Aids," EURASIP Journal on Advances in Signal Processing, Special Issue on Digital Signal Processing for Hearing Instruments, vol. 2009, Article ID No. 437807, Mar. 16, 2009, pp. 1-9.
European Search Report, dated Oct. 28, 2010.

* cited by examiner

SIGNAL DEREVERBERATION USING ENVIRONMENT INFORMATION

CROSS REFERENCE TO RELATED APPLICATIONS

This nonprovisional application claims the benefit of U.S. Provisional Application No. 61/325,830 filed on Apr. 20, 2010 and to Patent Application No. 10160435.3 filed in Europe, on Apr. 20, 2010. The entire contents of all of the above applications is hereby incorporated by reference.

TECHNICAL FIELD

The present application relates to improvements in processing algorithms in audio processing devices, in particular to an improved compensation for room reverberation. The disclosure relates specifically to an audio processing system comprising an audio processing device and an external device, where the external device is adapted to transmit an information signal to the audio processing device. The application furthermore relates to a method of operating an audio processing system.

The disclosure may e.g. be useful in applications such as hearing aids, ear phones or active ear protection devices, public address systems, teleconferencing systems, etc.

BACKGROUND ART

The following account of the prior art relates to one of the areas of application of the present application, hearing aids.

The primary purpose of a hearing aid (HA) is to amplify sound regions which would otherwise be inaudible to a hearing impaired user. In quiet, non-reverberant surroundings a state-of-the-art HA succeeds, and the user is usually able to hear and understand everything.

However, in reverberant environments, e.g. rooms with hard surfaces, churches, etc., the ability to understand speech declines. This is so because the signal from the target speaker is reflected on the surfaces of the environment; consequently, not only the direct (un-reflected) sound from the target speaker reaches the ears of the HA user, but also delayed and dampened versions are received due to the reflections. The larger and "harder" a room is, the more reflections. In the extreme case, the reflections are perceived as an echo.

The amount of reverberation in a room can be broadly characterized through a single quantity called T60 and defining a characteristic reverberation time. T60 is defined as the time required for reflections of a direct sound to decay by 60 dB below the level of the direct sound. The larger the value of T60, the more reverberation in the room. T60 and its measurement are defined in ISO 3382-1:2009.

Recently, a class of signal processing algorithms have been introduced which, in principle, are capable of processing the reverberant signal picked up at the microphone and produce a processed signal where the reverberation has been reduced, see e.g. [Habets, 2007] or [Löllmann, 2009] and the references therein. Ideally these algorithms would use the T60 to adjust the processing, but since this quantity is not known in general, it is estimated from the reverberant signal. Unfortunately this is difficult to do in a reliable manner, and the algorithms are rather sensitive to a decent estimate of T60. Had the T60 been known to the signal processing algorithms somehow, performance would be significantly better.

US 2009/208043 A1 describes an external device capable of wirelessly transmitting information about the local acoustic environment to a hearing aid. US 2004/213415 A1 describes a method of determining reverberation, e.g. for use in a hearing aid.

DISCLOSURE OF INVENTION

In an aspect, a system is provided that combines an audio processing device comprising a de-reverberation algorithm with an external transmitter, specific to a room or environment, which transmits to the audio processing device, information about the characteristics of the room. Specifically, for the algorithm class mentioned above, this information could be the average T60 of the room in question. Thus, instead of estimating the T60, the algorithms get the "truth" e.g. via a wirelessly transmitted information signal.

An object of the present application is to provide an audio processing system that is able to take account of the particular reverberation of the room or location where a user is presently located.

Objects of the application are achieved by the invention described in the accompanying claims and as described in the following.

An object of the application is achieved by an audio processing system comprising an audio processing device and an external device, the audio processing device comprising a signal processing unit adapted for running an algorithm for processing an input signal representing an acoustic signal from the environment of the user and providing a processed output signal, the audio processing device and the external device comprising a wireless interface adapted to allow the external device to transmit an information signal and the audio processing device to receive the information signal. The external device is adapted to include in the information signal a measure, characteristic of the reverberation of the room or location where the audio processing device is located, and the audio processing device is adapted to extract said measure of the reverberation from the information signal and use the measure as an input to said algorithm. The algorithm comprises a directional algorithm for providing a directional characteristic of the input signal, the directional algorithm being adapted to provide that the directional characteristic is the more focused in a direction of a target sound source, the larger the value of the measure of the reverberation of the room.

This has the advantage that the specific reverberation of a room can be taken into account in the processing of an electric signal representing an acoustic signal picked up in the room in question.

In an embodiment, the audio processing device and the external device located (or are adapted to be located) in or at the same room.

In a particular embodiment, the external device comprises a readable memory wherein said measure of reverberation is stored. The measure can e.g. be measured in advance and read into the memory before or after the external device is located in the room in question. In a particular embodiment, the external device comprises an interface (e.g. a wired or wireless interface) to a programming unit, e.g. a PC, to allow an easy transfer of information, including the measure of reverberation, to (a memory) of the external unit. In an embodiment, the external device is energized from a mains supply (e.g. when wall mounted). Alternatively, the external device comprises a battery (e.g. a rechargeable battery) for energizing the electronic components of the device). In an embodiment, the external unit is implemented as an RFID transponder component, e.g. a passive transponder, comprising the measure of reverberation of the room where it is located, and wherein the audio processing device is adapted to transmit an interrogation signal to the RFID transponder and to receive as a reply the measure of reverberation from the RFID transponder. In an embodiment, the external device is portable and energized by a local energy source, e.g. a battery. In a particular embodiment, the external device is a portable device adapted for being worn by a user and/or placed in an appropriate location of a room. In an embodiment, the external device is integrated with a portable communication device, e.g. a telephone (e.g. a cell phone) or an audio gateway for receiving a number of audio signals and (wired or wirelessly) transmitting a selected one of the audio signals to another device, e.g. a listening device (such as a headset or a hearing instrument).

In an embodiment, the audio processing system is adapted to provide that the listening device receives the measure of reverberation from the external device via an intermediate device. (e.g. via a communication device, e.g. a cellular telephone, a TV-set, or an audio gateway). Alternatively, the audio processing system is adapted to provide that the listening device receives the measure of reverberation directly from the external device.

In a particular embodiment, the external device is adapted to measure and/or estimate said measure of reverberation itself. In a particular embodiment, the external device comprises a microphone and a signal processing unit and a sound transducer. In an embodiment, the external device issues an acoustic probe signal and receives the reflected signal by the microphone and analyses the signal by comparing the issued probe signal with the received reflected signal by the signal processing unit (e.g. in a time-frequency environment) to provide a measure of the reverberation of the room in question. During installation, the external transmitter can thus e.g. self-calibrate, i.e., simply transmit a sound ping (audible or not) and measure the reverberation time itself.

In a particular embodiment, the measure of reverberation is the T60 measure or an estimate thereof. This reverberation time can be measured as indicated in ISO 3382-1:2009.

In a particular embodiment, the external device is adapted to make a reverberation measurement at certain predefined points in time, e.g. according to a predefined measurement frequency. In an embodiment, the external device comprises an activation element (e.g. a button on the device or via a wired or wireless interface and a programming unit, e.g. a PC or remote control) for initiating a reverberation measurement.

In a particular embodiment, the external device is adapted to store a number of measured values of said measure of reverberation at corresponding points in time and to determine a time averaged value, e.g. a running average.

The external device can be a device located on the wall of the room/enclosure or in a door frame, where a user wearing the audio processing device, e.g. a listening device enters the room.

Transmission of the information signal comprising a measure of reverberation of the room or location in question from the external device to the audio processing device can be via any of the existing wireless techniques (e.g. an analogue modulation scheme, such as FM (frequency modulation) or AM (amplitude modulation), or a digital modulation scheme, such as ASK (amplitude shift keying), e.g. On-Off keying, FSK (frequency shift keying), PSK (phase shift keying) or QAM (quadrature amplitude modulation), etc.). The external device (transmitter) can e.g. be installed by the user himself, e.g. inside a car or in other often used environments or in a room used for teleconferences (e.g. including video-conferences). It can also be installed by the authorities in charge of the room in question, e.g. churches, theatres, concert halls, cafés, museums, auditoria, class rooms, etc.

In an embodiment, the audio processing device comprises a forward path between an input transducer (microphone system and/or direct electric input (e.g. a wireless receiver)) and an output transducer. In an embodiment, the signal processing unit is located in the forward path.

In a particular embodiment, the audio processing device comprises a microphone. Alternatively or additionally, the audio processing device may comprise a direct (wired) electric input or a wireless input providing a direct electric input signal representative of a sound generated in the room where the audio processing device is located. In an embodiment, the direct electric input is received from a microphone of another device (e.g. an audio gateway or a mobile telephone or a wireless telephone) worn by the user or located in proximity of the user (e.g. within 2 m of the user). In an embodiment, the audio processing device comprises a signal processing unit adapted to execute an algorithm for reducing the effect of reverberation in the signal picked up by the microphone or microphones of the audio processing device or located in proximity of the user wearing the audio processing device, the algorithm being adapted for taking into account the measure of reverberation received from the external device.

In a particular embodiment, the audio processing device comprises an automatic speech recognition algorithm that uses said measure of reverberation to improve the quality of speech recognition.

In an embodiment, the audio processing device comprises a directional microphone system adapted to separate two or more acoustic sources in the local environment of the user wearing the audio processing device. In an embodiment, the directional system is adapted to detect (such as adaptively detect) from which direction a particular part of the microphone signal originates. This can be achieved in various different ways as e.g. described in U.S. Pat. No. 5,473,701 or in WO 99/09786 A1 or in EP 2 088 802 A1.

In an embodiment, the microphone and the rest of the audio processing device constitute two physically separate bodies, each having their own dedicated housing and either being not physically connected or physically connected by a releasable or fixed connecting mechanism, e.g. an electrical (and/or mechanical, e.g. acoustical) connector. In a particular embodiment, the audio processing device is a listening device, e.g. a hearing instrument. In an embodiment, the audio processing device is embodied in a hearing instrument of the BTE-type, e.g. comprising a BTE-part adapted for being located at or behind the ear of a user and an ITE-part (e.g. comprising an output transducer) adapted to be located in the ear canal or in the ear of the user. Alternatively, the microphone and the audio processing device may form part of the same physical body (e.g. a hearing instrument of the ITE-type adapted to be located completely in the ear canal of a user).

In an embodiment, the audio processing device comprises a portable device, e.g. an ear piece, e.g. a headset, and ear phone, an active ear protection device, a hearing instrument or combinations thereof.

In an embodiment, the audio processing device comprises a transmission unit for transmitting the processed signal to another device or system, e.g. via a (wired or wireless) network.

In an embodiment, the audio processing system comprises a teleconferencing system, e.g. for transmitting sound signals picked up at one location (e.g. a specific room for that purpose) to a receiver at another location (e.g. another teleconferencing system), e.g. via a network, e.g. an intranet or a public telephone net or the like. The teleconferencing system comprises a base unit and at least one microphone unit for picking up a sound signal and being in communication with the base unit, the base unit being adapted to receive a signal from an external device located in the room of the teleconferencing system, the base unit further comprising a signal processing unit, e.g. running a dereverberation algorithm adapted to use the measure of the reverberation of the room in question (received from the external unit) to improve the signal picked up by the at least one microphone unit before transmitting it to a receiver (e.g. located in another room or building or site).

In an embodiment, the audio processing system comprises a public address system, e.g. a classroom amplification system (as e.g. described in US 2008/0107277 A1). In such applications the dereveberation algorithm may run on a listening device worn by a person located in the room (e.g. an auditorium or a classroom) or the like (prone to reverberation) where the public address system is used.

In an embodiment, the algorithm adapted for processing an input signal representing an acoustic signal from the environment of the user and providing a processed output is a dereverberation algorithm. A dereverberation algorithm is e.g. described in [Habets, 2007] or [Löllmann, 2009]. In an embodiment, the algorithm adapted for processing an input signal representing an acoustic signal from the environment of the user and providing a processed output is integrated with a microphone system and/or with a directional algorithm. The measure characteristic of reverberation (e.g. reverberation time, e.g. T60, or another descriptor of reverberation) can e.g. be used to automatically adjust the behavior of the directionality algorithm. The higher the reverberation time in a room, the larger a part of the acoustic signal received by a listener in the room will be in the form of diffuse noise.

Diffuse noise can be counteracted by a directional algorithm, e.g. by generating a narrower beam pattern in a direction of the target signal (e.g. a forward direction). In an embodiment, the directionality algorithm is adapted to provide a more focused beam in a direction of a target sound source, the larger the value measure of the reverberation of the room (e.g. the larger the reverberation time, e.g. the larger the value of T60). In an embodiment, the reverberation measure is used in an algorithm for identifying a voice in the acoustic environment, e.g. a particular voice or a user's own voice (in case the audio processing device, e.g. a listening device, is worn by a user). In an embodiment, voice detection comprises an algorithm based on the determination of a measure of the modulation of the signal (e.g. a modulation index), where a voice signal is assumed to be present, if the modulation measure is above a predefined threshold value. In an embodiment, the voice detection algorithm is adapted to modify the threshold value of the modulation measure depending on the value of the reverberation measure, e.g. so that the threshold value of the modulation measure is decreased when the reverberation measure (e.g. the reverberation time, e.g. the value of T60) is increased.

In an embodiment, the voice detection algorithm is adapted to select or identify a target signal.

In an embodiment, the signal processing unit is adapted for enhancing the input signals and providing a processed output signal. In an embodiment, the signal processing unit is adapted to provide a frequency dependent gain to compensate for a hearing loss of a user.

In an embodiment, the audio processing device comprises an output transducer for converting an electric signal to a stimulus perceived by the user as an acoustic signal. In an embodiment, the output transducer comprises a number of electrodes of a cochlear implant or a vibrator of a bone conducting hearing device. In an embodiment, the output transducer comprises a receiver (speaker) for providing the stimulus as an acoustic signal to the user.

In an embodiment, the audio processing device comprises a voice detector for detecting whether a given input sound originates from a human voice (and/or from a particular voice, e.g. a target voice) or not. Examples of voice detector circuits based on analogue and digitized input signals are described in U.S. Pat. No. 5,457,769 and US 2002/0147580, respectively. In an embodiment, the audio processing device comprises an own voice detector for detecting whether a given input sound (e.g. a voice) originates from the voice of the user of the system. Own voice detection is e.g. dealt with in US 2007/009122 and in WO 2004/077090. In an embodiment, the microphone system of the audio processing device is adapted to be able to differentiate between a user's own voice and another person's voice and possibly from NON-voice sounds. This has the advantage of enabling the processing algorithm to differentiate the use of the measure of reverberation depending on the type of input signal. In an embodiment, the measure of reverberation is only used when a voice is detected that is NOT the user's own voice.

In an embodiment, the audio processing device further comprises other relevant functionality for the application in question, e.g. acoustic feedback suppression, etc.

A method of operating an audio processing system comprising an audio processing device adapted for processing an input signal and providing a processed output signal, and an external device, the audio processing device and the external device comprising a wireless interfaces adapted to allow the external device to transmit an information signal and the audio processing device to receive said information signal, respectively is furthermore provided by the present application. The method comprises providing in an external device a measure, characteristic of the reverberation of a room or location where the external device and/or the audio processing device is located;

providing and transmitting an information signal comprising the measure, characteristic of reverberation from the external device;

receiving the information signal from the external device in the audio processing device and extracting the measure characteristic of reverberation therefrom;

using the measure characteristic of reverberation in a processing algorithm of the audio processing device to process the input signal.

Preferably, the method comprises providing that the algorithm comprises a directional algorithm for providing a directional characteristic of the input signal, and that the directional algorithm is adapted to provide that the directional characteristic is the more focused in a direction of a target sound source, the larger the value of the measure of the reverberation of the room.

It is intended that the structural features of the system described above, in the detailed description of 'mode(s) for carrying out the invention' and in the claims can be combined with the method, when appropriately substituted by a corresponding process. Embodiments of the method have the same advantages as the corresponding systems.

In a particular embodiment, the measure characteristic of reverberation is used as an input parameter in the processing algorithm.

In a particular embodiment, the input signal comprises an electric signal picked up by an input transducer and representing an acoustic signal and wherein the processing algorithm is a dereverberation algorithm applied to the input signal.

In an embodiment, the method comprises identifying or selecting a target signal. In an embodiment, a voice detection algorithm is used to detect the target signal. In an embodiment, the method comprises to provide that the directionality algorithm adaptively identifies a target signal.

Further objects of the application are achieved by the embodiments defined in the dependent claims and in the detailed description of the invention.

As used herein, the singular forms "a," "an," and "the" are intended to include the plural forms as well (i.e. to have the meaning "at least one"), unless expressly stated otherwise. It will be further understood that the terms "includes," "comprises," "including," and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements maybe present, unless expressly stated otherwise.

Furthermore, "connected" or "coupled" as used herein may include wirelessly connected or coupled. As used herein, the term "and/or" includes any and all combinations of one or more of the associated listed items. The steps of any method disclosed herein do not have to be performed in the exact order disclosed, unless expressly stated otherwise.

BRIEF DESCRIPTION OF DRAWINGS

The disclosure will be explained more fully below in connection with a preferred embodiment and with reference to the drawings in which.

The figures are schematic and simplified for clarity, and they just show details which are essential to the understanding of the disclosure, while other details are left out. Throughout, the same reference names are used for identical or corresponding parts.

Further scope of applicability of the present disclosure will become apparent from the detailed description given hereinafter. However, it should be understood that the detailed description and specific examples, while indicating preferred embodiments of the disclosure, are given by way of illustration only, since various changes and modifications within the spirit and scope of the disclosure will become apparent to those skilled in the art from this detailed description.

MODE(S) FOR CARRYING OUT THE INVENTION

Figure 1:
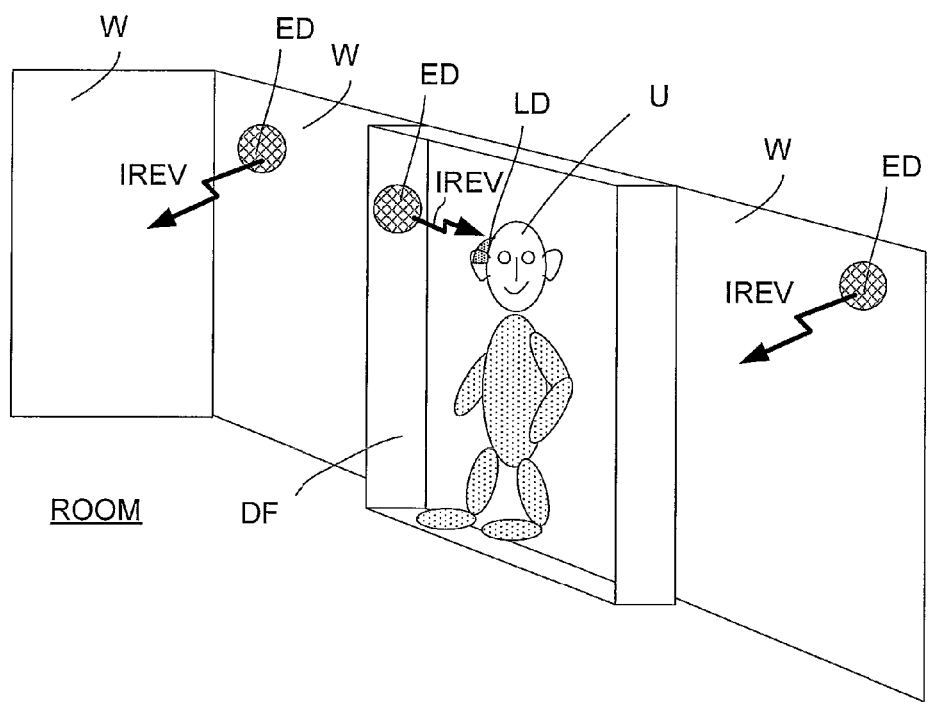
FIG. 1 shows an application scenario for an audio processing system according to a first embodiment of the present invention.

FIG. 1 shows an application scenario for an audio processing system according to an embodiment of the present invention. The audio processing system, e.g. as shown here, a listening system comprises one or more audio processing devices, here listening devices LD (here one is shown), worn by user U and one or more external devices EDn (here three are shown; typically more than one is present). The external devices EDn are located on the walls (ED1, ED2) of a room (ROOM) and in a frame (ED3) of a door (DF) for entering or leaving the room. The external devices EDn transmit a measure IREV characteristic of the reverberation time of the room (ROOM). The measure is e.g. the T60 reverberation time characteristic of the room where the external devices is located. The listening device LD is adapted to wirelessly receive the measure of reverberation of the room from at least one of the external devices and to use it in an algorithm for minimizing the effect of reverberation on a signal picked up by a microphone of the listening device when the user is located in the room (ROOM). The external devices are e.g. located at different positions in the room to ensure that a user has a large probability of receiving the measure IREV characteristic of the reverberation time of the room irrespective of where in the room he or she is located. The location and number of the external devices appropriate for covering a room of a given form and size (area) is preferably adapted to the transmission technology used by the wireless interfaces of the external device(s) and the listening device(s) (be it based on radiated fields or near-field electromagnetic coupling or acoustic or light communication technologies). Alternatively, the external device or devices (EDn) may be placed in a room relative to one or more specific users (e.g. to cover specific seats or locations for such specific users wearing a listening device LD).

Figure 2:
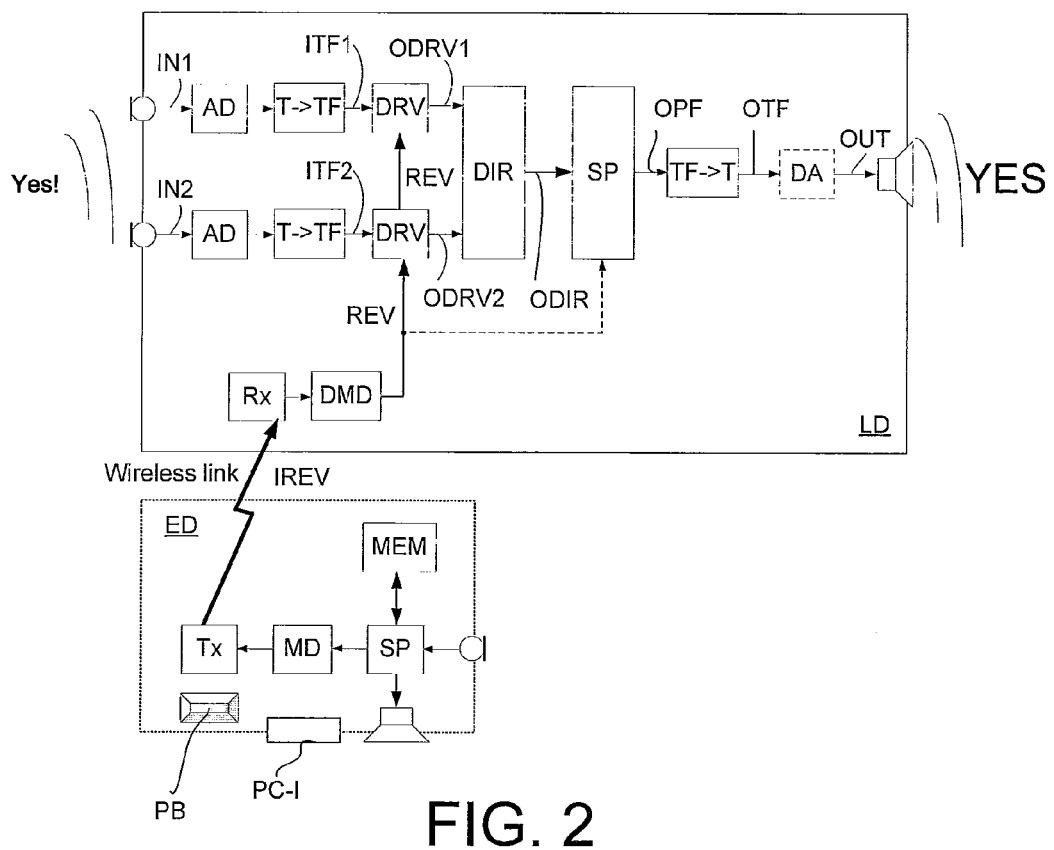
FIG. 2 shows a block diagram comprising parts of an audio processing system according to a second embodiment of the present invention.

FIG. 2 shows a block diagram comprising parts of an audio processing system according to an embodiment of the present invention. The audio processing system, here a listening system, comprises an audio processing device, here a listening device LD and an external device ED each comprising a wireless interface (at least) allowing a transmission of an information signal from the external device to the listening device. The wireless interface of the external device ED comprises an antenna and transmitter circuitry (Tx) for transmitting an information signal IREV to other devices. The wireless interface of the listening device LD comprises an antenna and receiver circuitry (Rx) for receiving the information signal IREV from the external device. The embodiment of a listening device shown in FIG. 2 comprises a microphone system comprising two microphones MIC/and MIC2 for picking up sounds from the environment and converting the sounds to analogue electric input signals IN1, IN2, respectively, each microphone being connected to an analogue to digital unit AD for providing a digitized version of the input signal. The digitized version of the input signals are fed to time to time-frequency conversion units (T->TF) for converting the input signal from a time domain representation to a time-frequency domain representation and providing as an output time-frequency signals ITF1(m,p) and ITF2(m,p), each unit (m,p) comprising a generally complex value of the input sound signal in question at a particular unit (m,p) in time and frequency. Other microphone systems may be used, e.g. a single microphone. Instead of AD and TF units a filter bank may be used to provide an input signal in the time-frequency domain. Otherwise, the input signal may be processed fully in the time domain. The signals ITF1, ITF2 from the microphones are processed in dereveberation units DRV, where they are subject to a dereverberation algorithm controlled by the reverberation time input REV received from the external device ED (and optionally from one ore more other detectors, cf. FIG. 3). The reverberation time input REV is extracted in demodulation unit DMD from the information signal IREV received via a wireless interface (Rx) of the listening device. The output signals ODRV1 and ODRV2 of the respective dereveberation units DRV, are fed to a directional unit DIR for extracting directional information from the microphone signals and for providing a resulting output signal ODIR for further processing in a signal processing unit SP of the signal path. Other processing algorithms (e.g. noise reduction, compression, anti-feedback, etc.) are possibly applied to the signal on its way through the signal path from input transducer to output transducer, e.g. in the signal processing unit SP. The reverberation time input REV is optionally fed to the signal processing unit SP. The processed output signal OPF from the signal processing unit SP, here a processed signal in a time frequency representation is fed to a time-frequency to time conversion unit (TF-T) providing a resulting processed signal OTF in the time domain. This signal is fed to a digital to analogue converter DA (or directly to an output transducer), whose output OUT is fed to an output transducer, e.g. as shown a receiver (speaker). In the embodiment of the listening device shown in FIG. 2, the directional unit DIR is shown to be located after the dereverberation units DRV. Alternatively the units may appear in opposite order (the directional unit receiving inputs ITF1 , ITF2 directly from the time to time-frequency conversion units (T->TF) and feeding a resulting directional signal ODIR to a dereverberation unit whose output is then fed to the signal processing unit SP. Further alternatively, the directional and dereverberation units (or algorithms) may be integrated receiving inputs from a number of microphones and delivering a directional output signal cleaned for reverberation effects.

The embodiment of the external device ED shown in FIG. 2 comprises a readable memory MEM storing a measure of reverberation of a specific room where the external device is mounted or intended to be used. The memory is connected to a signal processing unit SP, which can read the contents of memory MEM and modulate the measure of reverberation REV stored in the memory and forward the result to a modulator MD, which feeds the modulated signal to transmitter an antenna circuitry Tx for transmission of the modulated signal IREV (at least) to the listening device LD. The embodiment of an external device ED shown in FIG. 2 further comprises a speaker for issuing a (possibly inaudible) test signal (ping) and a microphone for picking up the response of the room. Timing and frequency properties of the signal picked up by the microphone is analysed in the signal processing unit SP and a measure of the reverberation of the room is provided and stored in the memory MEM. The determination of the actual reverberation of the room in question may be performed according to a predefined scheme, e.g. regularly and/ or initiated by a person via an activating element (PB, e.g. a push button). In an embodiment, the external device has an interface (PC-l, e.g. a wireless interface) to a computer, so that the measurement of reverberation can be initiated and monitored remotely. In an embodiment, the external device ED is portable and can be used to measure the reverberation of different rooms and possibly to feed the measurement result to a memory of another external device (e.g. of the type shown in FIG. 4) located in or intended to be located in the room in question. The external device ED typically comprises a local energy source (e.g. a battery) for energising the electronic components of the device. Alternatively, the external device ED is connected to a mains supply. An example of an external device for determining a reverberation time is disclosed in US 2004/0213415 A1.

Figure 3:
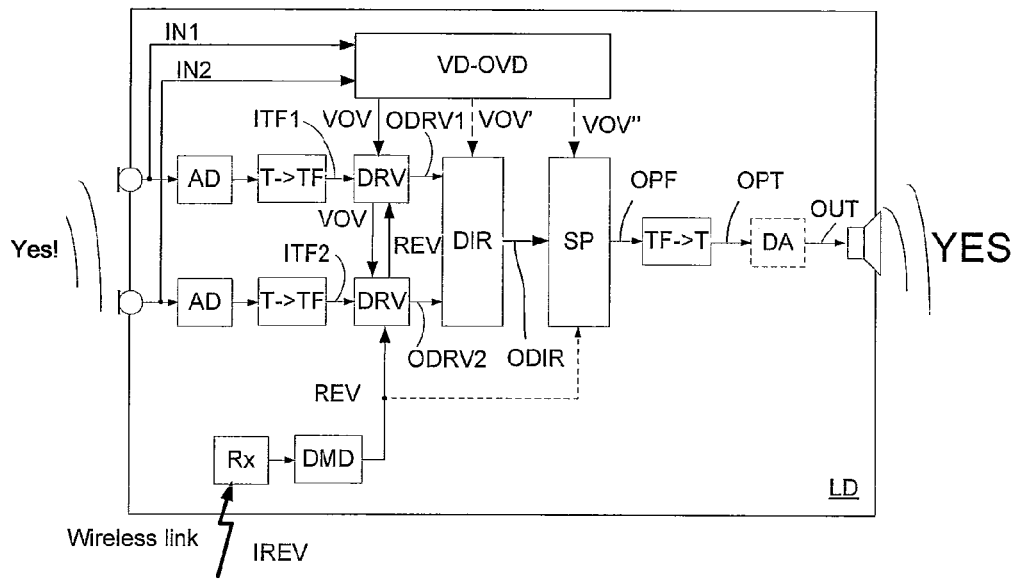
FIG. 3 shows a block diagram comprising parts of a listening device according to an embodiment of the present invention.

FIG. 3 shows a block diagram comprising parts of a listening device according to an embodiment of the present invention. The embodiment of a listening device shown in FIG. 3 has the same basic functionality as that of FIG. 2, but includes additionally a number of detectors VD-OVD for classifying the type of signal picked up by the microphone system. In the embodiment shown in FIG. 3, the detectors include a voice detector (VD) for identifying a human voice in the input signal and an own voice detector (OVD) for identifying the voice of a wearer of the listening device. In the embodiment shown in FIG. 3, the detectors VD-OVD receive microphone signals IN1 and IN2 as inputs and supply as output an input VOV to the dereveberation units DRV thereby providing an enhanced effect of the dereverberation algorithm. In an embodiment, the detectors VD-OVD, further receive the reverberation measure REV as an input to aid in the identification of a voice (e.g. an own voice, cf. e.g. EP 1 956 589 A1) in the input signal. In an embodiment, the presence of a human voice in the input microphone signal(s), as detected by a voice detector VD, activates the dereverberation algorithm, whereas the algorithm is deactivated when no voice is detected. In an embodiment, the presence of a user's own voice in the input microphone signal(s), as detected by an own voice detector OVD, deactivates the dereverberation algorithm, whereas the algorithm is activated when no own voice is detected. In an embodiment, the two detectors are combined. Other control inputs VOV' and VOV" from detector unit VD-OVD are optionally supplied to directional control unit DIR and/or to signal processing unit SP, respectively. Based on the input signals from the detectors, a more qualified use of the measure of reverberation of the room in a processing algorithm (e.g. a dereverberation algorithm (DRV) or other processing algorithm executed by the directional system (DIR) and/or the signal processing unit (SP) of the listening device) can be provided. In an integrated DIR and dereverberation unit e.g., the directional unit can identify the acoustic sources around a user and the voice detector/own voice detector can identify which one of the sources is a target voice, and the directional system can be adapted accordingly to optimize its focus on the target voice.

Figures 4A, 4B:
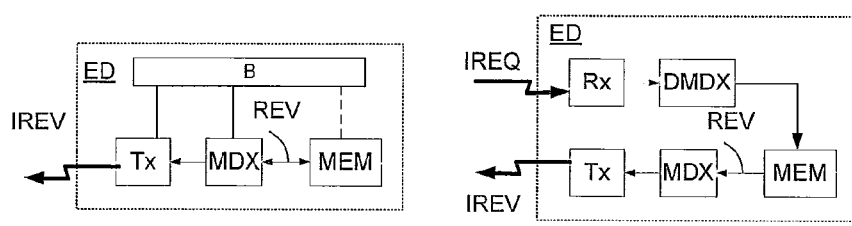
FIGS. 4a and 4b illustrate exemplary block diagrams comprising parts of an external device according to different embodiments of the present invention.

FIGS. 4a and 4b illustrate exemplary block diagrams comprising parts of an external device according to different embodiments of the present invention. FIG. 4a shows an embodiment of an external device ED comprising a battery B for energizing the components of the device. The external device comprises a readable memory MEM storing a measure of reverberation of a specific room where the external device is mounted or intended to be used. The memory is connected to a control and modulation unit MDX which can read the contents of memory MEM and modulate the measure of reverberation REV stored in the memory and forward the modulated signal to transmitter an antenna circuitry Tx for transmission of the modulated signal IREV to one or more listening devices within its transmission range. The embodiment of an external device ED shown in FIG. 4b is of the transponder type and comprises antenna and transceiver circuitry Rx, Tx for receiving an interrogation signal IREQ from a listening device and as a response transmitting a modulated signal IREV comprising a reverberation measure REV of a room as read from memory MEM. The external device comprises a demodulation and control unit DMDX connected to the receiver circuitry Rx and to the memory MEM and adapted to demodulate the received interrogation signal IREQ and initiate that the reverberation measure REV is read from the memory and fed to control and modulation unit MDX, where it is modulated and forwarded to the transmitter Tx. In an embodiment, the external device is capable of extracting the necessary energy to the reception of the request signal and the transmittal of the reverberation measure from the interrogation signal. In another embodiment, the external device comprises a local source of energy (or is connected to a mains supply).

In an embodiment, the wireless link between the external device and the listening device is based on a near-field coupling between two adjacent antennas. In an embodiment, the wireless link is based on far-field (radiated) electromagnetic signals.

The memory MEM may in general be a volatile memory (in which case the optional (dashed) connection in FIG. 4a to the battery B is present) or it may be a non-volatile memory. The memory may be a read only or read/write memory.

In an embodiment, the external device ED comprises a user interface, e.g. in the form of one or more user operable activation elements (cf. PB in FIG. 2, e.g. in the form of push buttons or toggle- or potentiometer-switches, or touch sensitive displays). In an embodiment, the external device comprises a user operable on-off switch, to switch power to the external device on or off.

Figures 5A, 5B:
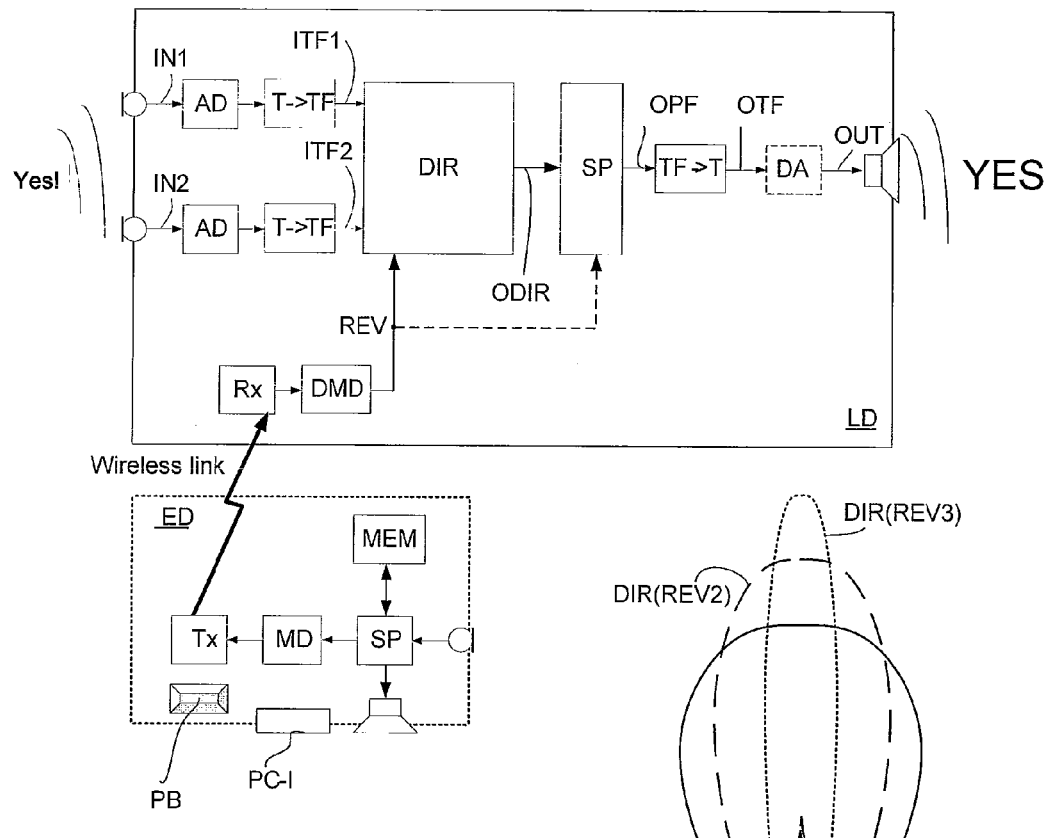
FIGS. 5a and 5b illustrate an audio processing system according to third embodiment of the present invention.

FIG. 5a shows an embodiment of an audio processing system comprising a listening device LD and an external device ED adapted to be able to establish a wireless link between them. A measure of the reverberation of the room where the devices are located can be transmitted from the external device to the listening device. The system comprises the same components as shown in FIG. 2 and described in connection therewith. A difference to the embodiment in FIG. 2 is that the signals ITF1, ITF2 from the microphones are fed directly to the directionality unit comprising an algorithm for determining a resulting directional signal (without being processed in de-reverberation units DRV). The directionality algorithm is influenced by the reverberation time input REV (e.g. T60) received from the external device ED (and optionally by signals from one or more other detectors, cf. FIG. 3). The measure of reverberation time REV can e.g. be used to influence the degree of directionality implemented by the directionality algorithm. In an embodiment, a larger value of reverberation time REV results in a more focused directionality characteristics (beam), e.g. in a continuous way or alternatively in steps. In an embodiment, the reverberation time parameter REV is used to switch between a number of predefined directionality characteristics as indicated in FIG. 5b, where more and more focused beams are implemented the higher the value of the reverberation time REV (REV1>REV2<REV3). It is e.g. assumed that the direction of maximum gain of the directionality characteristics is the direction of the target sound signal. A larger reverberation time results in a larger portion of the acoustic signal from a given sound source (e.g. a speaker) being reflected from surfaces (e.g. walls) of the room and arrive at a listener with a delay, such reflected and delayed signals being perceived as diffuse noise by the listener (in the sense that the signals arrive from a multitude of directions around the listener, at least from such directions comprising surfaces reflecting the signal from the sound source). The system may e.g. additionally comprise a voice detection unit (cf. e.g. VD-OVD in FIG. 3). In an embodiment, the directional algorithm (DIR) is adapted to adaptively identify and separate acoustic sources around a user wearing the listening device (LD) and the voice detector/own voice detector is adapted to identify, which one of the separated sources is a target voice. Thereby the directional algorithm can be adapted to optimize its focus on the target voice, e.g. the more so the larger the reverberation parameter REV.

Figure 6:
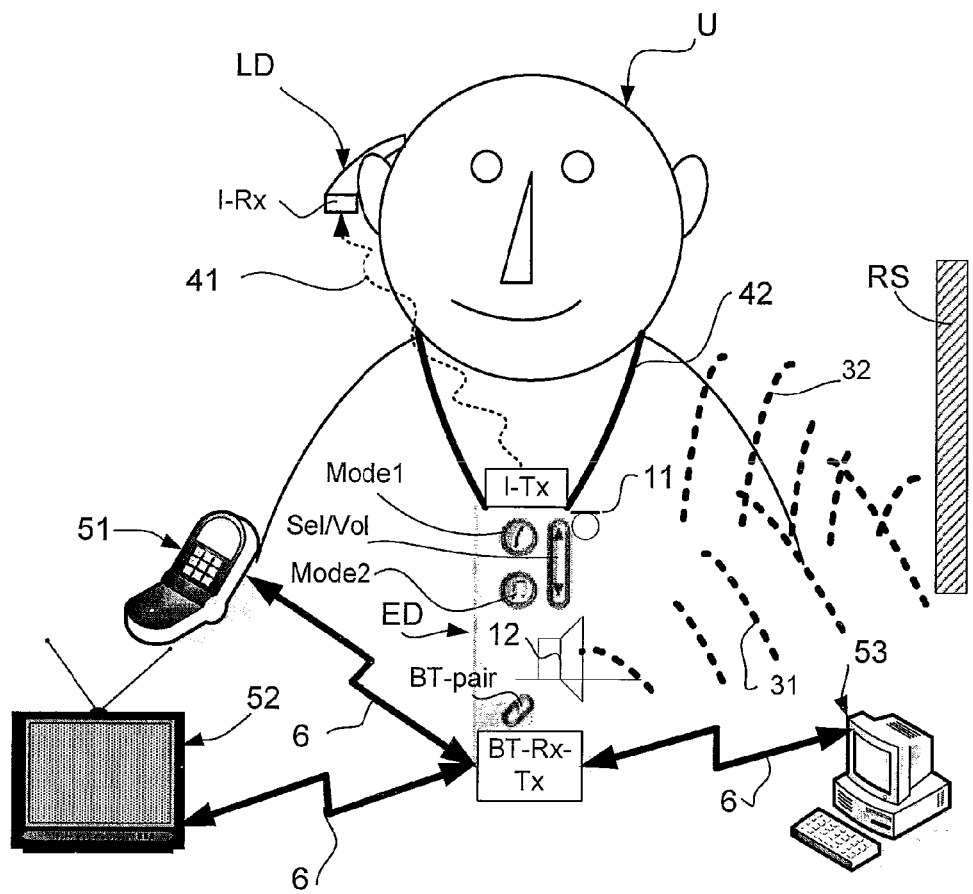
FIG. 6 shows an application scenario for an audio processing system according to a fourth embodiment of the present invention.

FIG. 6 shows an application scenario for an audio processing system according to an embodiment of the present invention. A user (U) wears a listening device (LD, e.g. a hearing instrument) at the ear and an external device (ED) in a strap 42 around the neck. The external device is integrated with an audio gateway for receiving a number of audio signals from devices 51 (cell phone), 52 (TV-set), 53 (PC) via wireless links 6, here assumed to be based on the Bluetooth standard (cf. Bluetooth transceiver BT-Rx-Tx of the external device, and assumed to be present in the other devices 51, 52, 53 as well). The audio gateway is adapted to allow a user to select one of the received audio signals (or a mixture thereof) on to transmit the selected one (or the mixture) to the listening device via a wireless link, here an inductive link 41 is assumed (cf. inductive transmitter I-Tx and receiver I-Rx of the external device and the listening device, respectively). Examples of audio gateway devices are e.g. disclosed in EP 1 460 769 A1 or WO 2009/135872 A1). In the embodiment of FIG. 6, the external device/audio gateway comprises a microphone and speaker (and a signal processing unit) adapted to allow a reverberation time measurement to be conducted, either automatically depending on certain predefined criteria or initiated by a user via a user interface on the external device (e.g. one of the mode selection buttons, Mode1, Mode2, Sel/Vol, BT-pair). During a reverberation time measurement, a predefined sound 31 (e.g. synthesized or stored in the external device (or received from another device 51, 52, 53)) is issued by the external device via the built in speaker 12 and reflections 32 from one or more reflecting surfaces (RS) are picked up by the built in microphone 11 of the external device (ED) and processed in the external device (or sent to another device for processing and subsequent reception of a measure of the reverberation). In an alternative setup, the audio gateway is adapted to receive a measure of reverberation time from another device (e.g. mounted on the wall of a room) via a wireless link (e.g. an inductive link or a Bluetooth link) and forward the received measure of reverberation time to the listening device via the wireless link between the audio gateway and the listening device (e.g. embedded in an audio signal and/or as a part of a control signal from the audio gateway to the listening device). In an embodiment, the external device is an RFID-part comprising a measure of the reverberation time of the room where it is located (cf. FIG. 4b). In an embodiment, the audio gateway is adapted to issue an interrogation signal to the RFID-part and to receive a measure of the reverberation time from the RF-ID-part and to transmit the received measure of reverberation time to the listening device via the wireless link between the audio gateway and the listening device.

The invention is defined by the features of the independent claim(s).

Preferred embodiments are defined in the dependent claims. Any reference numerals in the claims are intended to be non-limiting for their scope.

Some preferred embodiments have been shown in the foregoing, but it should be stressed that the invention is not limited to these, but may be embodied in other ways within the subject-matter defined in the following claims.

REFERENCES

[ISO 3382-1:2009] ISO 3382-1:2009, Acoustics—Measurement of room acoustic parameters—Part 1: Performance spaces.

[Habets, 2007] E.A.P. Habets, "Single- and Multi-Microphone Speech Dereverberation using Spectral Enhancement," Ph.D. Thesis, Technische Universiteit Eindhoven, The Netherlands, Jun. 25, 2007.

[Löllmann, 2009] H.W. Löllmann and P. Vary, "Low delay noise reduction and dereverberation for hearing aids, "EURASIP Journal on Advances in Signal Processing, Special issue on digital signal processing for hearing instruments, p. 1-9,Volume 2009 , January 2009.

US 2009/208043 A1 (STARKEY LABORATORIES) 20-08-2009

US 2004/213415 A1 (Rama et al.) 28-10-2004

U.S. Pat. No. 5,457,769 (EARMARK) 10-10-1995

US 2002/0147580 A1 (LM ERICSSON) 10-10-2002

US 2007/009122 A1 (SIEMENS AUDIOLOGISCHE TECHNIK) 11-01-2007

WO 2004/077090 A1 (OTICON) 10-09-2004

US 2008/0107277 A1 (PHONIC EAR) 08-05-2008

EP 1 956 589 A1 (OTICON) 13-08-2008

US 2004/0213415 A1 (Ratnam et al.) 28-10-2004

EP 1 460 769 A1 (PHONAK) 22-09-2004

WO 2009/135872 (OTICON) 12-09-2009

The invention claimed is:

1. An audio processing system comprising: an audio processing device and an external device physically detached from the audio processing device and wirelessly transmitting to the audio processing device information about characteristics of a room or location, where the audio processing device is located,
said audio processing device including
an input transducer providing an electric input signal representing an acoustic signal from an environment of a user of the audio processing device,
a signal processing unit adapted for running an algorithm for processing said input signal or a signal derived therefrom and providing a processed output signal, and
a wireless interface adapted to allow the audio processing device to wirelessly receive an information signal from the external device,
wherein the audio processing device is adapted to extract a measure of reverberation from the information signal received from the external device, and
wherein the audio processing device is further adapted to use said measure of reverberation as an input to said algorithm, and said algorithm is adapted for taking into account said measure of reverberation; and
said external device including
a microphone,
a signal processing unit,
a sound transducer, and
a wireless interface adapted to allow the external device to wirelessly transmit an information signal to the audio processing device,
wherein the external device is adapted to make at certain predefined points in time a reverberation measurement by
issuing an acoustic probe signal,
receiving a reflected signal by the microphone; and
analyzing the received reflected signal by comparing the issued acoustic probe signal with the received reflected signal by the signal processing unit to provide a measure characteristic of the reverberation of said room or location, and
the external device is further adapted to include in said information signal said measure characteristic of the reverberation of said room or location and to wirelessly transmit said information signal to the audio processing device.

2. An audio processing system according to claim 1 wherein the external device comprises a memory wherein said measure of reverberation is stored.

3. An audio processing system according to claim 1 wherein the external device is adapted to measure and/or estimate said measure of reverberation itself.

4. An audio processing system according to claim 1 wherein said measure of reverberation is the T60 measure or an estimate thereof.

5. An audio processing system according to claim 1 wherein the external device comprises a microphone and a signal processing unit and a sound transducer.

6. An audio processing system according to claim 1 wherein the external device is adapted to store a number of measured values of said measure of reverberation at corresponding points in time and to determine a time averaged value.

7. An audio processing system according to claim 1 wherein the external device is adapted for being mounted at a wall or a ceiling of a room or in a door frame through which the room can be entered or left.

8. An audio processing system according to claim 1 wherein the external device is a portable device adapted for being worn by a user.

9. An audio processing system according to claim 1 wherein the external unit is integrated with a communication device.

10. An audio processing system according to claim 1 wherein the external unit is implemented as an RFID transponder component comprising the measure of reverberation of the room where it is located, and wherein the audio processing device is adapted to transmit an interrogation signal to the RFID transponder and to receive as a reply the measure of reverberation from the RFID transponder.

11. An audio processing system according to claim 1 wherein the audio processing device comprises a microphone unit and wherein said algorithm is adapted for reducing the effect of reverberation in the signal picked up by the microphone unit and adapted for taking into account the measure of reverberation received from the external device.

12. An audio processing system according to claim 1 wherein the audio processing device comprises an automatic speech recognition algorithm that uses said measure of reverberation to improve the quality of speech recognition.

13. An audio processing system according to claim 1 wherein the audio processing device comprises a voice detector comprising a voice detection algorithm that uses said measure of reverberation in the detection of a voice.

14. An audio processing system according to claim 1 wherein the audio processing device comprises a voice detector comprising a voice detection algorithm adapted to select or identify a target signal.

15. An audio processing system according to claim 1 comprising a teleconferencing or a public address system.

16. An audio processing system according to claim 1 wherein the audio processing device comprises at least one of an ear piece, a headset, an ear phone, an active ear protection device, a hearing instrument, and combinations thereof.

17. A method of operating an audio processing system comprising an audio processing device adapted for processing an input signal and providing a processed output signal, and an external device physically detached from the audio processing device, the audio processing device and the external device each comprising a wireless interface adapted to allow the external device to wirelessly transmit an information signal and the audio processing device to wirelessly receive said information signal, respectively, the method comprising:

issuing an acoustic probe signal from the external device at predefined points in time;

receiving a reflection of the acoustic probe signal as a reflected signal by a microphone of the external device;

comparing the acoustic probe signal with the reflected signal to calculate a measure characteristic of reverberation of a room or location where the external device and/or the audio processing device is located;

providing and wirelessly transmitting an information signal comprising the measure characteristic of reverberation from the external device;

wirelessly receiving the information signal from the external device in the audio processing device and extracting the measure characteristic of reverberation therefrom; and using the measure characteristic of reverberation in a processing algorithm of the audio processing device to process the input signal into a processed output signal.

18. A method according to claim 17 wherein the input signal comprises an electric signal picked up by an input transducer and representing an acoustic signal and wherein the processing algorithm comprises a dereverberation algorithm applied to the input signal or a signal derived therefrom.

19. A method according to claim 17, further comprising: identifying or selecting a target signal.

20. A method according to claim 19 wherein a voice detection algorithm is used to detect the target signal.

21. A method according to claim 17, further comprising: providing that the processing algorithm comprises a directional algorithm for providing a directional characteristic of the input signal, and that the directional algorithm is adapted to provide that the directional characteristic is the more focused in a direction of a target sound source, the larger the value of the measure of the reverberation of the room; and providing that the directionality algorithm adaptively identifies a target signal.

22. An audio processing system according to claim 1, wherein
the external device is adapted for being mounted at a wall or a ceiling of the room or location or in a door frame through which the room or location can be entered or left.

23. An audio processing system according to claim 1, wherein
the external unit is integrated with a cell phone or an audio gateway.

24. An audio processing system according to claim 1, configured to provide that the audio processing device receives the measure of reverberation from the external device via an intermediate device.

25. An audio processing system according to claim 1, configured to provide that the audio processing device receives the measure of reverberation directly from the external device.

26. An audio processing system according to claim 1, configured to provide that the external device makes a reverberation measurement at certain predefined points in time.

27. An audio processing system according to claim 1, wherein the external device comprises an activation element for initiating a reverberation measurement.

28. An audio processing system according to claim 1, wherein the external device comprises an interface to a programming unit, a PC or remote control allowing the initiation of a reverberation measurement.

* * * * *